United States Patent [19]

Yuito et al.

[11] Patent Number: 4,760,481
[45] Date of Patent: Jul. 26, 1988

[54] THIN FILM MAGNETIC HEAD HAVING AN IMPROVED COIL

[75] Inventors: Isamu Yuito; Eijin Moriwaki, both of Hachiouji; Kazuo Shiiki, Kanagawa; Keiko Shiokawa, Higashiyamato; Yoshihiro Hamakawa, Kokubunji; Saburo Suzuki, Minami-ashigara; Harunobu Saito, Odawara, all of Japan

[73] Assignee: Hitachi, Ltd., Tokyo, Japan

[21] Appl. No.: 888,116

[22] Filed: Jul. 22, 1986

[30] Foreign Application Priority Data

Jul. 26, 1986 [JP] Japan .................................. 61-164117

[51] Int. Cl.⁴ .......................... G11B 5/20; G11B 5/12
[52] U.S. Cl. ..................................... 360/123; 360/125
[58] Field of Search ................ 360/123, 125, 127, 119

[56] References Cited

U.S. PATENT DOCUMENTS 4,219,854  8/1980  Church et al. .................. 360/119 X

OTHER PUBLICATIONS

Fabrication of a Multitrack, Thin Film Head by Nord et al., J. Appl. Phys. 53 (3), Mar. 1982 pp. 2611–2613.

*Primary Examiner*—John H. Wolff
*Attorney, Agent, or Firm*—Antonelli, Terry & Wands

[57] ABSTRACT

Disclosed is a thin film magnetic head having a structure wherein the main portion of a coil consists of a copper or copper alloy layer and its upper surface is covered with a thin film mask consisting of titanium, titanium oxide, chromium and/or chromium oxide. The magnetic head of the invention can prevent the occurrence of projecting etching residues at the upper edge portion of the coil and can easily increase the cross-sectional area and the winding density of the coil. Furthermore, when the thin film mask consists of titanium and-/or titanium oxide, a titanium diffusion prevention film consisting of chromium, for example, is interposed between the thin film mask and the copper or copper alloy, so that the resistance change of the coil scarcely takes place owing to heat treatment in a production process after the formation of the coil and the head reliability can be further improved.

6 Claims, 3 Drawing Sheets

FIG. 3
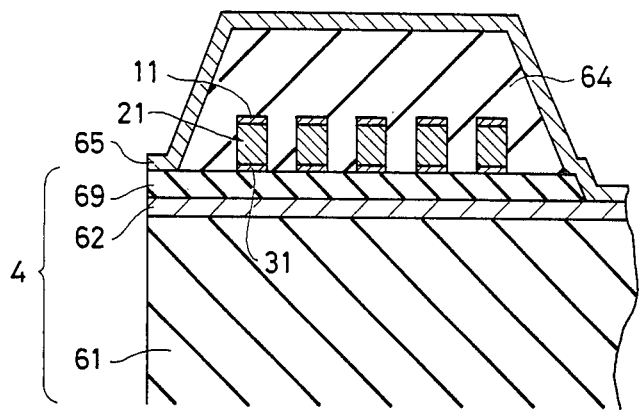
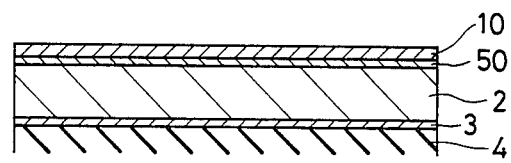
FIG. 4a
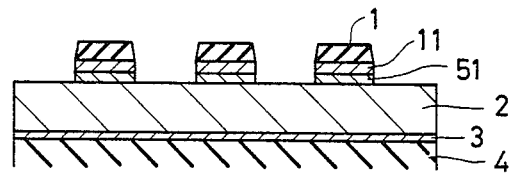
FIG. 4b
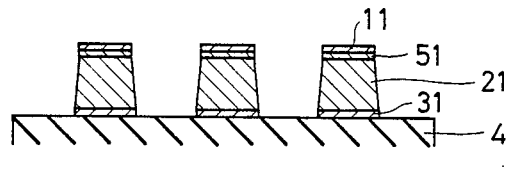
FIG. 4c

THIN FILM MAGNETIC HEAD HAVING AN IMPROVED COIL

BACKGROUND OF THE INVENTION

This invention relates to a thin film magnetic head having a coil which has a large cross-sectional area and high winding density, and more particularly to a thin film magnetic head having high reliability.

One example of the conventional thin film magnetic heads, such as the one that is disclosed in Japanese Patent Laid-Open No. 84020/1980, comprises upper and lower poles (magnetic cores) consisting of an Ni-19 wt. % Fe alloy (or the so-called "permalloy"), an insulating layer(s) separating both poles from each other, a signal input/output coil, and the like that are disposed on a nonmagnetic substrate.

Since recording density has been increased recently in magnetic recording/reproduction apparatuses such as disk drive systems, the development of a thin film magnetic head having high output and low noise has become essential. To develop such a thin film magnetic head, it is necessary to reduce the core length, to attain higher winding density of the coil and to increase the cross-sectional area of a coil conductor so as to reduce the electric resistance of the coil. However, all these are contradictory to one another from the aspect of coil production. Because the number of windings will drop if the core length is decreased or the cross-sectional area of the coil conductor will become small. The following two methods may be used to solve this problem.

One method is to laminate the coil as described in "Fabrication of Multitrack Thin Film Head" by Y. Noro et al., Journal of Applied Physics 53(3), March, 1982. However, this method involves a problem that the process is likely to be complicated. The other method is to reduce the pattern width of the coil conductor and its gap but increase the height of the coil conductor as described in "Lead Fabrication of Thin Film Magnetic Head for PCM Recording and Its Recording Performance", by Yamazaki et al., Digests of the 7th Annual Conference on Magnetics in Japan, Nov., 1983. Since this method finely patterns a thick film, etching residue is likely to occur, and hence selection of a mask material and selection of etching conditions must be optimized. The etching residue is formed in a projecting form at the upper edge portion of the coil conductor. In this case, discharge occurs between this projecting portion and the upper pole during the operation of the magnetic head and dielectric breakdown of the insulating layer is likely to occur.

During recording, the thin film magnetic head is used at a current density of about $10^6$ A/cm$^2$, and by far severer requirement is imposed on the magnetic head in the aspect of electromigration resistance than the semiconductor device which is used generally at a current density of $10^4$ to $10^5$ A/cm$^2$. Therefore, unlike the semiconductor device, it is necessary to use copper or copper alloy having extremely high electromigration resistance for the thin film magnetic head and to enlarge its cross-sectional area.

SUMMARY OF THE INVENTION

The present invention is directed to provide a thin film magnetic head having a coil which has a large cross-sectional area and high density, and having also high reliability.

To accomplish the object described above, the thin film magnetic head in accordance with the present invention includes upper and lower poles disposed on a substrate, an insulating layer or layers separating them magnetically and electrically at portions other than their junction and disposed on the substrate between them and a coil disposed in the insulating layer and inputting and outputting signals, wherein the main portion of the coil consists of copper (Cu) or a conductor alloy consisting principally of Cu, and the upper surface of the main portion of the coil is covered with a thin film mask made of a material having higher etching resistance than the coil material and having good adhesion to the insulating layer existing on the coil. Furthermore, in order to improve bonding power between the main portion of the coil and the insulating film below the coil, the lower surface of the main portion of the coil may be covered with an intermediate thin film of a material having high bonding power with the insulating film as is known in the art. In this case, the coil has a multilayered structure consisting of the thin film mask, the main portion and the intermediate thin film.

A particularly excellent effect can be obtained if the thin film mask is made of at least one material selected from the group consisting of Ti, a Ti oxide, Cr and a Cr oxide.

When ion milling is effected, Ti has a higher etching rate ratio with Cu or the Cu alloy than Cr and the Ti oxide has likewise a higher etching rate ratio than the Cr oxide. Therefore, Ti and/or the Ti oxide is a particularly preferred material for the thin film mask.

Particularly when the Ti film, the Ti oxide film or the composite film of Ti and the Ti oxide is used for the mask material, the electric resistance of the coil sometime increases due to heat-treatment in the process after the formation of the coil, such as curing treatment of a resin. This is because Ti is diffused into Cu or the Cu alloy and specific resistance increases. In a coil having a structure wherein 0.5 $\mu$m-thick Ti is deposited on a 2 $\mu$m-thick Cu film, for example, the electric resistance increases by about 5% after heat-treatment at 350° C. for 10 hours. In the production line of the thin film magnetic head, the electric resistance of the coil must be controlled strictly to, for example, 15±1 $\Omega$, that is, about ±7%. Accordingly, the rise of the electric resistance of 5% described above is not negligible.

To solve this problem, it is effective to sandwich a film for preventing diffusion of Ti between Cu or the Cu alloy and the Ti film. Cr described above is effective as the film for preventing the diffusion of Ti. In a coil having a structure wherein a 500 Å-thick Cr film is formed between a 2 $\mu$m-thick Cu film and a 0.5 $\mu$m-thick Ti film, for example, no increase could be observed in the electric resistance of the coil even after the heat-treatment at 350° C. for 10 hours described above.

The requirements imposed on the film for preventing the Ti diffusion are that the diffusion coefficient of the film material into Cu and the diffusion coefficient of Ti into the film for preventing the Ti diffusion are small or in other words, the entropy term is small and the activation energy is great. In the case of Cr described above, the diffusion coefficient of Cr into Cu and the activation energy are 1.6 (cm$^2$/s) and 2.5 (eV), respectively. As the materials that provide substantially the similar diffusion prevention effect, mention can be made of oxides such as $SiO_2$ and $Al_2O_3$, refractory metals such as W, Mo, Ta, and furthermore, Nb, Ni, Rh, Pt, Pd and V.

One example of the materials of the intermediate thin film for improving the bonding power between the coil and the insulating film therebelow is Cr.

Cu or the Cu alloy as the principal material of the coil conductor (any Cu alloys may be used so long as they are for the thin film conductor) cannot be patterned by a reactive gas. Therefore, it has been a customary practice to make patterning as shown in FIG. 1b by ion milling using a photoresist as a mask 1 and an Ar gas as shown in FIG. 1a. If a thick coil conductor 2 made of Cu is patterned by this conventional method, however, projecting etching residues 5 are likely to occur and to be redeposited onto the side wall of the photoresist 1. To avoid this problem, the thickness of the mask must be reduced and at the same time, the etching rate ratio of the mask material to Cu or the Cu alloy must be increased.

FIG. 1a is a sectional view showing the state where a layer 3 for the intermediate thin film which is made of Cr and the coil conductor 2 made of Cu are disposed on the substrate 4 and then the photoresist mask 1 is formed thereon. FIG. 1b is a sectional view showing the state after patterning by ion milling, and not only the intermediate thin film 31 and the coil main portion 21 that are patterned but also the projecting etching residues 5 are shown occurring. FIG. 1c is a sectional view showing the state after the photoresist mask 1 is removed, and the etching residues 5 are left unremoved.

In order to minimize the occurrence of the etching residues 5, the present invention uses, for example, Cr and Ti whose sputtering yield is as small as about ¼ of that of Cu, as the mask material. When $O_2$ gas is added into the Ar gas, these metals can further reduce the etching rate ratio. In accordance with the ion milling method, for example, the etching rate ratio becomes about 1/20 in the (Ar+15 vol % $O_2$) gas. This is because the surface of Ti or Cr is oxidized, and these oxides provide the same effect as when used as the mask.

The entire upper surface of Cu or the Cu alloy layer of the coil conductor layer which is to be patterned must be covered completely by the thin film mask until etching is complete. A aimed thickness of the thin film mask after patterning of the coil is completed by etching is at least 0.1 $\mu m$ in view of variance of the etching process. The thickness of the thin film mask before etching can be determined by the aimed thickness of the thin film mask after patterning, the thickness of the coil main portion consisting of Cu or the Cu alloy and the etching rate ratio of the mask material to Cu or to the Cu alloy. If the thickness of the thin film mask is too great, the etching residues will occur undesirably at the upper edge portion of the thin film mask in the same way as the projecting etching residues at the upper edge portions of the coil conductor that occur in accordance with the prior art technique. Generally, the thin film mask is about 0.3 $\mu m$ thick after completion of patterning. However, if etching residues are confirmed not to have occured to a deteriomental extent, the thin film mask may be of course thicker than the thickness described above, but the production cost will increase.

The lower limit of the thickness of the film for preventing the Ti diffusion is such that the thin film formed by sputtering or the like becomes a continuous film but not a film having an island form. (Generally, it is about 100 Å thick.) The upper limit of the film thickness is below the thickness at which patterning becomes difficult.

Generally, the projecting etching residues are likely to occur at the upper edge portion of the coil of the thin film magnetic head. The present invention is effective for preventing the occurrence of the etching residues and can be applied particularly effectively to a head of the type in which the coil conductor is at least 2 $\mu m$ thick.

The thin film magnetic head of the present invention can be produced by thin film formation technique such as sputtering, vacuum deposition or the like and spinning of resin in the same way as in the prior art technique.

BRIEF DESCRIPTION OF THE DRAWINGS

FIG. 3 is a sectional view of the thin film magnetic head in one embodiment of the present invention;

FIGS. 4a to 4c are sectional views showing stepwise the production process of the thin film magnetic head in accordance with another embodiment of the present invention;

DESCRIPTION OF THE PREFERRED EMBODIMENTS

Embodiment 1

Figure 1A:
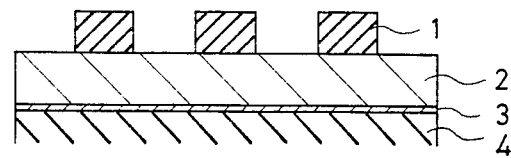
FIGS. 1a to 1c are sectional views showing stepwise a conventional thin film magnetic head production process.
Figure 1B:
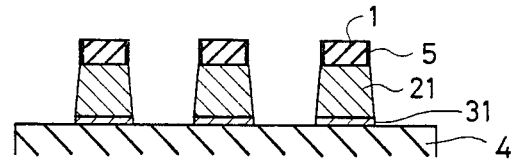
Figure 1C:
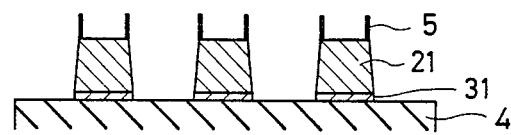
Figure 2A:
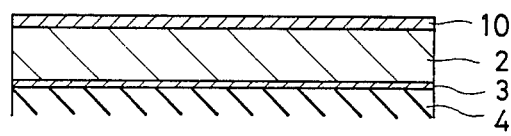
FIGS. 2a to 2c are sectional views showing stepwise the production process of the thin film magnetic head in accordance with one embodiment of the present invention.
Figure 2B:
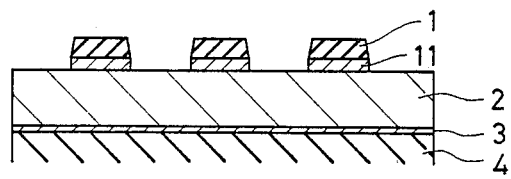
Figure 2C:
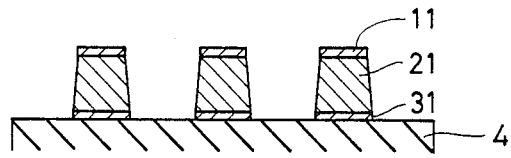

The first embodiment of the invention will be described with reference to FIGS. 2a to 2c and FIG. 3. FIGS. 2a to 2c are sectional views showing step-wise the coil formation process of the thin film magnetic head in this embodiment. Hereinafter, the production process of the thin film magnetic head in this embodiment will be described stepwise with primary referece to the coil formation process of the thin film magnetic head.

(i) After a lower pole is formed on a ziroconium oxide ($ZrO_2$) plate, an insulating film is formed to obtain a substrate 4.

(ii) A Cr film 3, a Cu layer 2 and then a Ti film 10 are continuously deposited on the substrate 4 by sputtering as shown in FIG. 2a. The Cr film 3 is an intermediate thin film to improve the bonding power between the Cu layer 2 and the substrate 4. The substrate temperature is 250° C. at the time of deposition of each film. The Cr film 3, the Cu layer 2 and the Ti film 10 are 0.05 $\mu m$, 2 $\mu m$ and 0.4 $\mu m$ thick, respectively.

(iii) The Ti film 10 is patterned using a photoresist film 1 as the mask as shown in FIG. 2b to obtain a thin film mask 11 consisting of Ti. Patterning of the Ti film 10 in this embodiment is effected by reactive ion milling using a mixed gas of 50 vol % $CF_4$ gas and 50 vol % Ar gas, (Ar+$CF_4$). A reactive ion etching (RIE) method using the $CF_4$ gas is found also effective. The milling rate ratio of the AZ series photoresist (a product of American Hoechst Corporation) to Ti is about 2 in the reactive ion milling method. In other words, the photoresist has a greater milling rate than Ti. Therefore, the thickness of the photoresist 1 is set to be four times (i.e. 1.6 μm) that of the Ti film 10 in view of the change of dimension, in this embodiment.

(iv) After the photoresist film 1 is removed, the Cu layer 2 and the Cr film 3 are patterned using the Ti thin film mask 11, thereby forming the coil main portion 21 consisting of Cu and the intermediate thin film 31 consisting of Cr. However, in the case of ion milling using only Ar, the Cu milling rate ratio to Ti is as small as about 4; hence the (Ar+$O_2$) gas is used to improve the milling rate ratio. Here, after a chamber is evacuated to $2 \times 10^{-6}$ Torr, $O_2$ is introduced to $4 \times 10^{-5}$ Torr and then Ar is introduced to $1.4 \times 10^{-4}$ Torr. Thereafter, ion milling is effected. The milling rate ratio at this time is about 20, and 2 μm-thick Cu can be patterned sufficiently by 0.4 μm-thick Ti.

In order to obtain a sufficient milling rate ratio, it is a desirable practice to first evacuate the chamber, then introduce the $O_2$ gas to $1 \times 10^{-5}$ Torr or higher and then the Ar gas to a pressure necessary for carrying out ion milling. If the introduction quantity of the $O_2$ gas is smaller than the quantity described above, the milling rate ratio will drop undesirably. The introduction quantity of the $O_2$ gas may be increased up to such an extent where no problem occurs for the ion milling apparatus.

(v) After a polyimide resin layer 64 is formed on the coil and the insulating film 69 as is well known in the art, an upper pole 65 is formed on the resin layer 64 to complete the thin film magnetic head shown in FIG. 3. In this drawing, reference numeral 61 represents a ziconium oxide $ZrO_2$ plate and 62 is the lower pole. These members 61 and 62 constitute the substrate 4 together with the insulating film 69 (consisting of $SiO_2$ or the like).

In the thin film magnetic head in accordance with this embodiment, no projecting residues are found on the upper edge portion of the coil conductor, and a coil having a great cross-sectional area and high density can be produced easily. Moreover, reliability can be improved, too.

Embodiment 2

The milling rate ratio can be increased by use of the (Ar+$O_2$) gas in Embodiment 1 because a Ti oxide is formed on the surface of the Ti film. Therefore, the Cu film can be patterned in the same way as in Embodiment 1 by using a Ti oxide as a mask in place of Ti and using the Ar gas.

In this embodiment, the coil is formed by use of the $TiO_2$ film in place of the Ti film 10 shown in FIG. 2a. The $TiO_2$ film is 0.4 μm thick. The $TiO_2$ film is patterned by the RIE method using the photoresist 1 as the mask and the $CF_4$ gas. After the thin film mask is formed by patterning the $TiO_2$ film, the photoresist 1 is removed and Cu is then patterned by use of the $TiO_2$ film as the mask. Patterning is made by the ion milling method using only the Ar gas. The Ar gas pressure is $1.4 \times 10^{-4}$ Torr. This method can produce the same coil as in Embodiment 1.

Embodiment 3

In the forgoing Embodiments 1 and 2, Cu as the principal material of the coil conductor is in direct contact with Ti or the Ti oxide. In the coils having such a film structure, however, the resistance of the coil increases due to the heat-treatment in the process after the formation of the coil. This is because Ti is diffused into Cu. Therefore, a film for preventing the diffusion of Ti is formed between Ti or the Ti oxide and the Cu layer.

This embodiment will be described with reference to FIGS. 4a to 4c and FIGS. 5 and 6. FIGS. 4a to 4c are sectional views showing the coil formation process of the thin film magnetic head in this embodiment. Hereinafter, the production process of the thin film magnetic head in this embodiment will be described step-wise with primary reference to the coil formation process.

(i) After the lower pole is formed on the zirconium oxide ($ZrO_2$) Plate, the insulating film is formed to obtain the substrate 4.

(ii) As shown in FIG. 4a, the first Cr film 3, the Cu layer 2, the second Cr film 50 and the Ti film 10 are continuously deposited on the substrate 4 by sputtering. The first Cr film 3 is an intermediate thin film to improve the bonding power between the Cu layer 2 and the substrate 4. The second Cr film 50 is the Ti diffusion prevention film. The substrate temperature is 250° C. at the time of deposition of each film. The first Cr film 3, the Cu layer 2, the second Cr film 50 and the Ti film 10 are 0.05 μm, 2 μm, 0.05 μm and 0.4 μm thick, respectively.

(iii) The Ti film 10 and the second Cr film 50 are patterned using the photoresist film 1 as a mask as shown in FIG. 4b to form a thin film mask 11 consisting of Ti and the Ti diffusion prevention film 51 consisting of Cr. The patterning method is the same as that of Embodiment 1. Namely, it is effected by the reactive ion milling method using the mixed gas of 50 vol % of $CF_4$ gas and 50 vol % of Ar gas.

(iv) After the photoresist film 1 is removed, the Cu layer 2 and the first Cr film 3 are patterned by the Ti thin film mask as shown in FIG. 4c to form the coil main portion 21 consisting of Cu and the intermediate thin film 31 consisting of Cr. The patterning method for forming the coil main portion 21 and the intermediate thin film 31 is the same as that of (iv) of Embodiment 1, and the ion milling method using the (Ar+$O_2$) gas is employed in order to improve the milling rate ratio of Cu to Ti.

Figure 5:
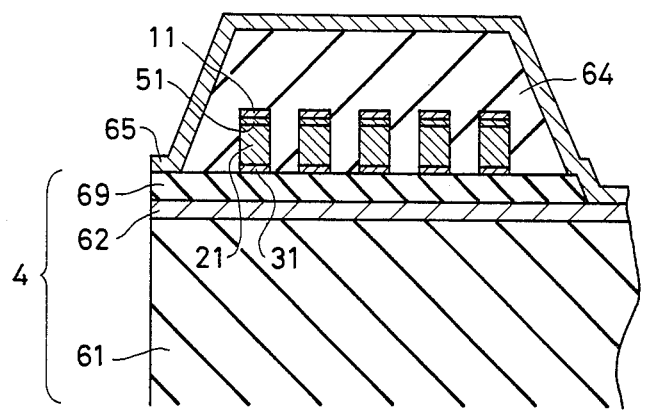
FIG. 5 is a sectional view of the thin film magnetic head in another embodiment of the present invention.

(v) After a polyimide resin layer 64 is formed on the coil and the insulating film 69 in a known manner, the upper pole 65 is formed thereon to complete the thin film magnetic head shown in FIG. 5.

Besides the effects brought forth by Embodiment 1, the thin film magnetic head of this embodiment provides the effect that the resistance change of the coil does not occur by the heat-treatment of the subsequent production process such as the curing process of the polyimide resin layer 64, and hence the coil reliability can be improved. Beside Cr, oxides such as $SiO_2$ and $Al_2O_3$, refractory metals such as W, Mo and Ta and Nb, V, Ni, Rh, Pt and Pd are found likewise effective as the diffusion preventing film material.

Figure 6:
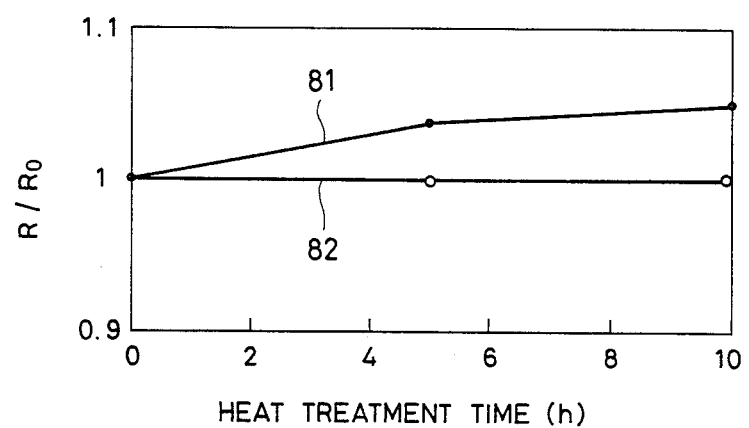
FIG. 6 is a diagram showing the relation between the heat treating time of the thin film magnetic head and the electric resistance of the coil in each embodiment of the present invention.

FIG. 6 shows the effect of the Ti diffusion prevention film consisting of Cr. The abscissa represents the heat-treating time at 350° and the ordinate does the change $R/R_o$ of the coil resistance before ($R_o$) and after (R) the heat-treatment. Black circle (●) represents the resistance changes $R/R_o$ of the coil not having the diffusion prevention film described in Embodiment 1. The ratio $R/R_o$ becomes 1.05 after the heat-treatment at 350° C. for 10 hours, and the resistance becomes great by 5%. In contrast, in the coil equipped with the Cr film as the Ti diffusion prevention film, the increase of the resistance does not occur as represented by white circle (○).

In FIG. 6 curve 81 represents the resistance change when the diffusion prevention film is not disposed and curve 82 does the resistance change when the latter is disposed.

Incidentally, like reference numerals are used throughout the drawings to identify like members or constituents.

What is claimed is:

1. A thin film magnetic head equipped on a substrate thereof with a lower pole, an upper pole, an insulating layer interposed between both of said poles and isolating them from each other both electrically and magnetically at portions other than their junction and a coil disposed in said insulating layer, wherein the main portion of said coil consists of copper, and the upper surface of the main portion of said coil is covered with a thin film mask comprised of at least one material selected from the group consisting of titanium, a titanium oxide, chromium and a chromium oxide and when said thin film mask is comprised of at least one material selected from the group consisting of titanium and a titanium oxide, a diffusion prevention film for preventing the diffusion of titanium into the main portion of said coil is interposed between said thin film mask and the main portion of said coil.

2. A thin film magnetic head according to claim 1, wherein said diffusion prevention film is made of a material selected from the group consisting of Cr, Nb, V, Ni, Rh, Pt, Pd, W, Mo, Ta, $SiO_2$ and $Al_2O_3$.

3. A thin film magnetic head according to claim 2, wherein said diffusion prevention film is made of Cr.

4. A thin film magnetic head according to claim 3, wherein the lower surface of the main protion of said coil is covered with an intermediate thin film made of Cr.

5. A thin film magnetic head according to claim 1, wherein the lower surface of the main portion of said coil is covered with an intermediate thin film having high bonding power with said insulating film existing below the main portion of said coil.

6. A thin film magnetic head according to claim 5, wherein said intermediate thin film is made of Cr.

* * * * *